US011239007B2

(12) United States Patent
Faulkner et al.

(10) Patent No.: US 11,239,007 B2
(45) Date of Patent: Feb. 1, 2022

(54) ELECTRICAL ISOLATOR

(71) Applicant: CROMPTON TECHNOLOGY GROUP LIMITED, Solihull (GB)

(72) Inventors: Dale V. L. Faulkner, Stourbridge (GB); Paul Peacock, Solihull (GB)

(73) Assignee: CROMPTON TECHNOLOGY GROUP, LTD, Solihull (GB)

( * ) Notice: Subject to any disclaimer, the term of this patent is extended or adjusted under 35 U.S.C. 154(b) by 103 days.

(21) Appl. No.: 16/713,806

(22) Filed: Dec. 13, 2019

(65) Prior Publication Data

US 2020/0321147 A1    Oct. 8, 2020

(30) Foreign Application Priority Data

Apr. 2, 2019  (EP) ..................................... 19275040

(51) Int. Cl.
*H01B 17/56* (2006.01)
*B64D 37/32* (2006.01)
(Continued)

(52) U.S. Cl.
CPC ............. *H01B 17/56* (2013.01); *B64D 37/32* (2013.01); *B64D 41/00* (2013.01); *H01B 19/00* (2013.01)

(58) Field of Classification Search
CPC . H01B 17/34; H01B 3/08; H01B 3/48; H01B 1/04; H01B 17/56; H01B 19/00;
(Continued)

(56) References Cited

U.S. PATENT DOCUMENTS

| 3,711,124 A | * | 1/1973 | Gerholt | ................... F16L 59/20 |
| | | | | 285/47 |
| 3,993,331 A | * | 11/1976 | Schwarz | ............... F16L 21/022 |
| | | | | 285/53 |

(Continued)

FOREIGN PATENT DOCUMENTS

| AT | 340215 | 12/1977 |
| DE | 2702925 | 7/1978 |
| DE | 2702925 A1 | 7/1978 |

OTHER PUBLICATIONS

European Search Report for European Application No. 19275040.4; Application Filing Date Apr. 2, 2019; dated Oct. 9, 2019, 10 pages.

*Primary Examiner* — Angel R Estrada
(74) *Attorney, Agent, or Firm* — Cantor Colburn LLP

(57) ABSTRACT

An electrical isolator includes a first fluid-carrying member and a second fluid-carrying member spaced apart from the first fluid-carrying member in an axial direction and a resistive, semi-conductive or non-conductive component located between the first and second fluid-carrying members. The component is adapted to convey fluid flowing from the first fluid-carrying member to the second fluid-carrying member. The isolator also include a first fluid sealing member provided between the first fluid-carrying member and the component, a second fluid sealing member provided between the second fluid-carrying member and the component, and a reinforcing composite encircling the first fluid-carrying member, the second fluid-carrying member and the resistive, semi-conductive or non-conductive component. A a radially inner portion of the component separates the first fluid-carrying member and the second fluid-carrying member by an axial distance. The first and second sealing members are located within the axial distance between the first and second fluid-carrying members.

12 Claims, 3 Drawing Sheets

(51) Int. Cl.
*B64D 41/00* (2006.01)
*H01B 19/00* (2006.01)

(58) Field of Classification Search
CPC ........ B64D 45/02; B64D 37/32; B64D 41/00; F16L 25/01; F16L 25/02
USPC ......... 174/30, 138 R, 650, 68.1, 77 R, 88 R, 174/70 C, 95, 110 R, 137 R; 285/47, 53, 285/45, 221.1; 361/212, 218, 217, 373
See application file for complete search history.

(56) References Cited

U.S. PATENT DOCUMENTS

| | | | | |
|---|---|---|---|---|
| 4,147,381 | A * | 4/1979 | Schwarz | F16L 25/03 285/371 |
| 4,398,754 | A * | 8/1983 | Caroleo | F16L 25/021 285/107 |
| 4,654,747 | A * | 3/1987 | Covey | F16L 25/03 361/215 |
| 5,131,688 | A * | 7/1992 | Tricini | B29C 44/1242 285/53 |
| 9,200,735 | B2 * | 12/2015 | Marban | F16L 25/03 |
| 10,112,724 | B2 | 10/2018 | Rorabaugh et al. | |
| 10,361,017 | B2 * | 7/2019 | Chase | H01B 17/34 |
| 2017/0103832 | A1 | 4/2017 | Chase et al. | |

* cited by examiner

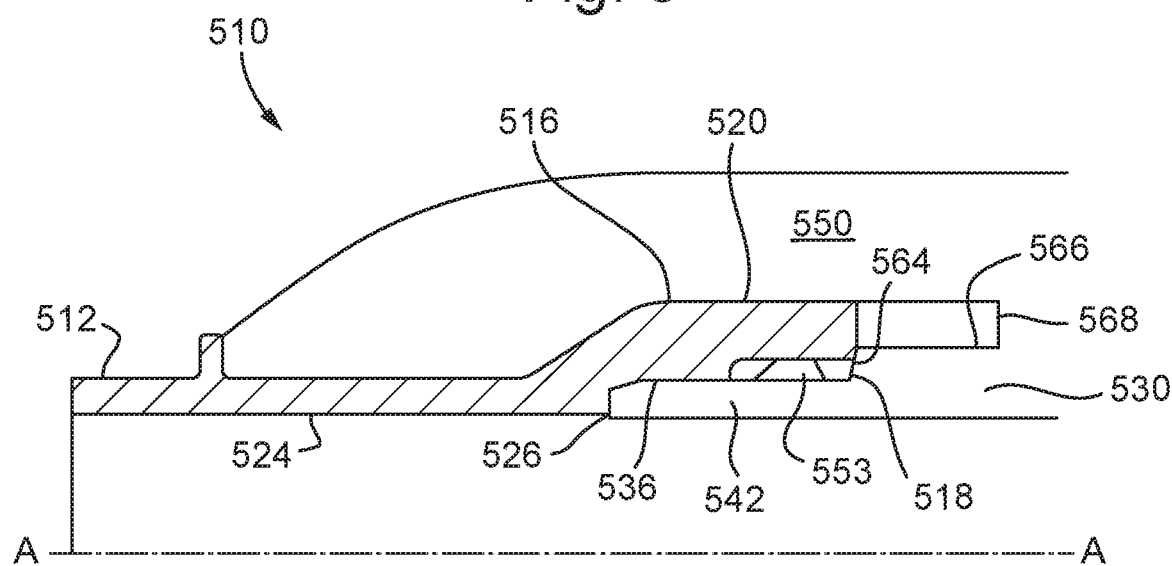
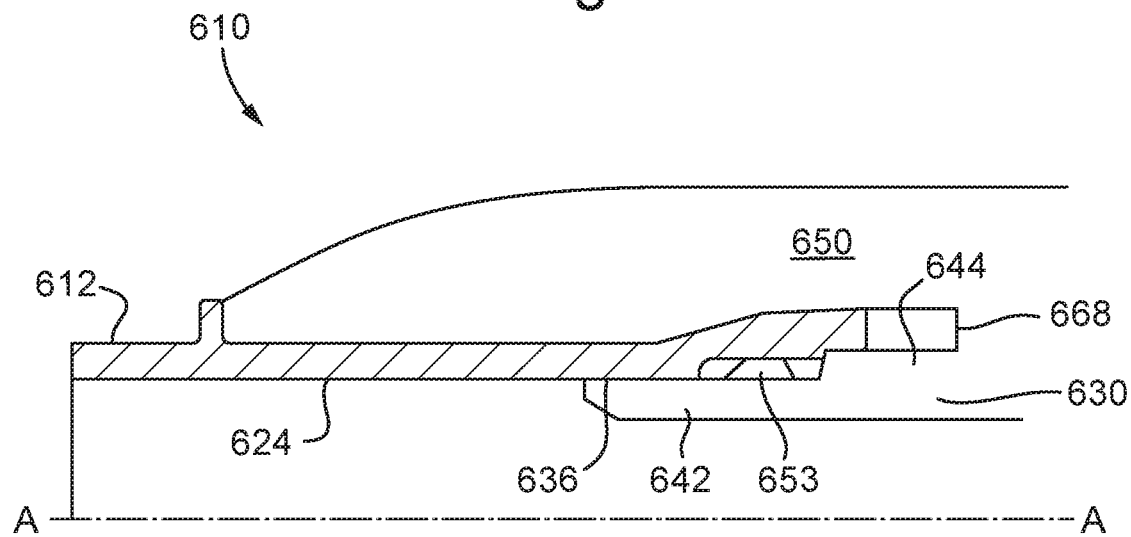

ELECTRICAL ISOLATOR

CROSS-REFERENCE TO RELATED APPLICATIONS

This application claims the benefit of European Application 19275040.4 filed Apr. 2, 2019, the disclosure of which is incorporated herein by reference in its entirety.

FIELD

The present disclosure relates generally to an electrical isolator, and more specifically to an electrical isolator for use in a hydraulic fluid line or fuel line of a vehicle or machine such as an aircraft. The electrical isolator may be used for connecting two fluid-carrying members such as pipes, hoses or tubes, for example pipes conveying hydraulic fluid or fuel.

BACKGROUND

Aircraft and other vehicles contain a large number of fluid conveying systems, in particular hydraulic and fuel systems that comprise fluid conveying components such as pipes. Such components are typically metallic or a composite material and have good electrical conductivity.

Devices are incorporated into such systems to form electrical isolators between the metallic components thereof. These isolators prevent build-up of electrostatic charge by safely dissipating static build up, and also prevent excessive electrical current flowing through the system, for example due to a lightning strike. Both of these events may cause a fire hazard if such isolators were not present in the system.

When incorporated into a fluid conveying system, the electrical isolator also needs to act as a safe passage for fluid. In certain systems, for example hydraulic systems or hydraulic fluid lines in an aircraft, the isolator needs to be able to withstand high pressures, in addition to other load and environmental factors.

The present disclosure is aimed at balancing the above factors to provide an electrical isolation function within a pressurised fluid system.

When used in aircraft in particular although not exclusively, it is also desirable to make the electrical isolator as small and as light weight as possible.

US 2017/0103832 A1 discloses an electrical isolator for use in a fluid conveying system. The electrical isolator comprises a first fluid-carrying member and a second fluid-carrying member spaced apart from the first fluid-carrying member; a resistive, semi-conductive or non-conductive component located between and sealed against the first and second fluid-carrying member, wherein the resistive, semi-conductive or non-conductive component is adapted to convey fluid flowing from the first fluid-carrying member to the second fluid-carrying member; a reinforcing composite encircling the first fluid-carrying member, the second fluid-carrying member and the resistive, semi-conductive or non-conductive component, wherein the reinforcing composite is continuous and may provide a conductive path between the first fluid-carrying member and the second fluid-carrying member, wherein the reinforcing composite comprises fibre and a resin mixture, and the resin mixture comprises resin and a conductive additive.

SUMMARY

In accordance with an aspect of the disclosure, there is provided an electrical isolator. The isolator includes: a first fluid-carrying member and a second fluid-carrying member spaced apart from the first fluid-carrying member in an axial direction; a resistive, semi-conductive or non-conductive component located between the first and the second fluid-carrying member, wherein the resistive, semi-conductive or non-conductive component is adapted to convey fluid flowing from the first fluid-carrying member to the second fluid-carrying member; a first sealing member provided between the first fluid-carrying member and the resistive, semi-conductive or non-conductive component; a second sealing member provided between the second fluid-carrying member and the resistive, semi-conductive or non-conductive component; and a reinforcing composite encircling the first fluid-carrying member, the second fluid-carrying member and the resistive, semi-conductive or non-conductive component. A radially inner portion of the resistive, semi-conductive or non-conductive component separates the first fluid-carrying member and the second fluid-carrying member by an axial distance, and the resistive, semi-conductive or non-conductive component is configured such that the first and second sealing members are located within the axial distance between the first fluid-carrying member and the second fluid-carrying member.

Typically, a minimum separation between the wetted internal surfaces of the first fluid-carrying member and the second fluid-carrying member (as provided by the axial distance by which the radially inner portion of the resistive, semi-conductive or non-conductive component separates the first fluid-carrying member and the second fluid-carrying member) may be required in electrical isolators for use in fuel and hydraulic systems. This minimum separation may be set at a relatively high value to ensure that the likelihood of arcing between the first fluid-carrying member and the second fluid-carrying member (for example due to a lightning strike) is very low. This is because electricity will typically take an easier path rather than travel over a relatively large distance, such that there will be no or very little risk of arcing occurring adjacent to fuel in the isolator.

Typically, the minimum separation required may be between about 0.5 cm (about 0.2") and about 5 cm (about 2"), more preferably between about 1.27 cm (0.5") and 3.81 cm (1.5"). The minimum separation required may typically depend on the size of an isolator, on the electrical requirements of the isolator and on expected static build up in the isolator.

In the electrical isolator of US 2017/0103832 A1, the resistive, semi-conductive or non-conductive component takes the form of a tube, each side thereof having a T-shape in cross section. The radially inner surface of the tube corresponds to the base or the narrower part of the T-shape. The top or wider part of the T-shaped resistive, semi-conductive or non-conductive component is radially outward of the base and extends over respective flanges in the first and second fluid carrying members. Grooves are machined into the radially outer surfaces of the respective flanges and O-rings are provided in the grooves to form a fluid seal between the resistive, semi-conductive or non-conductive component and the respective first and second fluid carrying members.

It will be understood that in the arrangement described, the grooves are positioned in the wider part of the T and so are separated by a greater distance than the minimum required separation of the first and second fluid-carrying members which is provided by the base of the T. Because of this, the total width of the electrical isolator must be significantly greater than the minimum required separation of the first and second fluid-carrying members, i.e. it may typically be in the range of about 3.81 cm to 15.24 cm (about 1.5" to 6").

The electrical isolator according to the disclosure provides a strong joint to withstand high pressures and a device that effectively dissipates charge build-up and electrically isolates the junction between two fluid-conveying devices whilst reducing the achievable axial dimensions of the device and consequently reducing the volume of material used and the weight of the device. As the resistive, semi-conductive or non-conductive component is configured such that the first and second sealing members are located within the axial distance between the first fluid-carrying member and the second fluid-carrying member, the total axial extent of the electrical isolator according to the disclosure may be reduced compared to that of known isolators such as the electrical isolator of US 2017/0103832 A1.

The inventors have recognised that the resistive, semi-conductive or non-conductive component of the electrical isolator of US 2017/0103832 A1 may be inverted such that the axial dimension or width of the radially inner portion is greater than the axial dimension or width of the radially outer portion. To do this, the inventors have recognised that the first and second sealing members may be provided between the radially inner surface of the respective flanges and the radially outer surface of the radially inner annular portion. When using sealing members such as O-rings provided in grooves, this may be a more difficult solution to achieve as the grooves may be machined into the radially inner surfaces of the flanges (i.e. into the radially inner surface of an annular component) or the grooves may be formed in the radially outer surface of the radially inner annular portion of the resistive, semi-conductive or non-conductive component but this would typically not be a metallic material known to be suitable for machining.

The resistive, semi-conductive or non-conductive component could take any suitable form. In one preferred aspect of the disclosure however, the resistive, semi-conductive or non-conductive component comprises the radially inner portion adjacent to a radially outer portion, the radially outer portion having a second axial dimension, wherein the second axial dimension is less than a first axial dimension of the radially inner portion, and wherein the axial distance is equal to the first axial dimension.

This shape of the resistive, semi-conductive or non-conductive component allows the first sealing member and the second sealing member to be provided on respective sides of the radially outer annular portion between a radially outer surface of the radially inner annular portion and a surface of the respective first fluid-carrying member and second fluid-carrying member. By placing the sealing members between the radially outer surface of the radially inner annular portion and a surface of the respective first fluid-carrying member and second fluid-carrying member, the pressure on the sealing members is spread over a wider base than in prior art arrangements, thus improving the strength of the seal provided.

In addition to the above, the resistive, semi-conductive or non-conductive component will typically have a lower coefficient of thermal expansion than the first and second fluid-carrying members. The seal provided in the electrical isolator according to the disclosure will therefore perform better at high temperatures than electrical isolators of the prior art due to the relative expansion and contraction of the resistive, semi-conductive or non-conductive component and the first and second fluid-carrying members.

In any aspect of the disclosure, the first fluid sealing member may be provided between the radially inner portion and the first fluid-carrying member on a first side of the radially outer portion, and the second fluid sealing member may be provided between the radially inner portion and the second fluid-carrying member on a second side of the radially outer portion.

The first and second fluid-carrying members may be configured to be slidingly engageable with the radially inner portion and the radially outer portion of the resistive, semi conductive or non-conductive component for ease of assembly of the electrical component.

In some examples of the disclosure, a radially inner surface of the resistive, semi-conductive or non-conductive component may protrude radially beyond a radially inner surface of the first fluid-carrying member and/or the second fluid-carrying member. However, this may disrupt flow through the electrical isolator and so preferably, in any aspect of the disclosure, a radially inner surface of the resistive, semi-conductive or non-conductive component may be substantially flush with a radially inner surface of the first fluid-carrying member and the second fluid-carrying member.

The reinforcing composite of the electrical isolator of the disclosure may typically be formed by providing a fibre and resin mixture which may then be cured to provide a rigid composite. There may therefore be a risk of resin leaking into internal parts of the electrical isolator and potentially damaging the first and second sealing members or other parts of the isolator. It may therefore be desirable to provide further seals to stop resin leaking in this way.

In any aspect of the disclosure, the electrical isolator may further comprise a third sealing member provided between the radially outer portion of the resistive, semi conductive or non-conductive component and the first and second fluid-carrying members.

The third sealing member could take many possible forms. In one preferred aspect, the third sealing member comprises a resistive, semi conductive or non-conductive material and extends from the first fluid-carrying member to the second fluid-carrying member. In this way, the third sealing member may also function to provide electrical isolation between the first and second fluid-carrying members and may also limit relative movement between the first and second fluid-carrying members.

In an alternative preferred aspect of the disclosure, the resistive, semi conductive or non-conductive component may further comprise a stepped portion provided between the radially inner portion and the radially outer portion. The stepped portion has a third axial dimension, and the first axial dimension is greater than the third axial dimension and the third axial dimension is greater than the second axial dimension.

The first and second fluid-carrying members may be configured to be slidingly engageable with the radially inner portion, the stepped portion and the radially outer portion of the resistive, semi conductive or non-conductive component for ease of assembly of the electrical component.

Preferably, a third sealing member is provided between the stepped portion and/or the radially outer portion and the first fluid-carrying member, and a fourth sealing member is provided between the stepped portion and/or the radially outer portion and the second fluid-carrying member.

In any aspect of the disclosure, the third sealing member or the third and fourth sealing members may comprise one or more environmental seals. The environmental seals may be configured to stop or limit resin from leaking into the electrical isolator during production thereof and prior to a resin in the reinforced composite being cured.

As discussed above, typically, the separation between the wetted internal surfaces of the first fluid-carrying member and the second fluid-carrying member (as provided by the axial distance between the first fluid-carrying member and the second fluid-carrying member) must meet a minimum requirement.

In any aspect of the disclosure, the first axial dimension may be between about 0.5 cm and about 5 cm (about 0.2" and about 2").

More preferably, the first axial dimension may be between about 1.27 cm and about 3.81 cm (about 0.5" and about 1.5").

From a further aspect of the disclosure, a hydraulic or fuel system in an aircraft comprising an electrical isolator as claimed in any preceding claim is provided.

From a still further aspect of the disclosure, a method of forming one or more electrical isolators is provided. The method comprises: placing a resistive, semi-conductive or non-conductive component between a first fluid-carrying member and a second fluid-carrying member such that a radially inner portion of the resistive, semi-conductive or non-conductive component separates the first fluid-carrying member and the second fluid-carrying member by an axial distance; providing a first fluid sealing member between the first fluid-carrying member and the resistive, semi-conductive or non-conductive component; providing a second fluid sealing member between the second fluid-carrying member and the resistive, semi-conductive or non-conductive component. The resistive, semi-conductive or non-conductive component is configured such that the first and second fluid sealing members are located within the axial distance between the first fluid-carrying member and the second fluid-carrying member. The method also includes winding a fibre and resin mixture around the first fluid carrying-member, the resistive, semi-conductive or non-conductive component and the second fluid-carrying member; and curing the fibre and resin mixture.

The method of the disclosure may further comprise: prior to winding the fibre and resin matrix, providing a third sealing member between the first and second fluid carrying members and adjacent the resistive, semi-conductive or non-conductive component; applying a compressive force to the third sealing member; and after curing the fibre and resin mixture, removing the compressive force from the third sealing member.

BRIEF DESCRIPTION OF THE DRAWINGS

Various non-limiting examples will now be described, by way of example only, and with reference to the accompanying drawings in which:

FIG. 5 shows a cross-section of part of an electrical isolator in accordance with an example of the present disclosure; and FIG. 6 shows a cross-section of part of an electrical isolator in accordance with an example of the present disclosure.

DETAILED DESCRIPTION

The present disclosure relates to electrical isolators, which may be used in aircraft hydraulic systems or hydraulic fluid lines in order to provide a strong fluid carrying structure whilst controlling induced electric current (e.g. by lightning) and dissipation of electrostatic charge.

Figure 1:
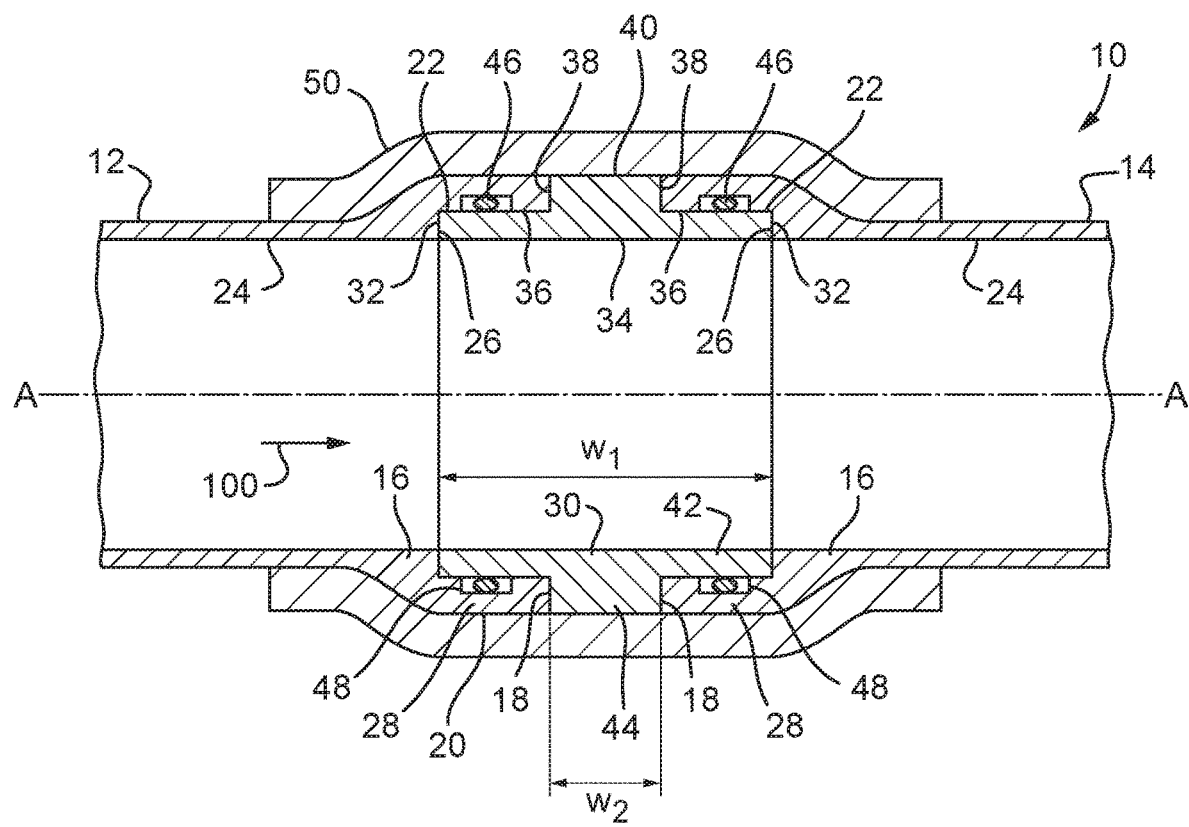
FIG. 1 shows a cross-section of an electrical isolator in accordance with an example of the present disclosure.

FIG. 1 shows a cross section of an electrical isolator or fluid carrying element 10 according to an example of the present disclosure.

The electrical isolator 10 forms part of a fluid conveying network, such as a hydraulic fluid network in an aircraft. Fluid, for example hydraulic fluid, may flow through the electrical isolator 10 in the direction of arrow 100.

The electrical isolator 10 comprises a first fluid-carrying member or pipe 12 and a second fluid-carrying member or pipe 14. Both the first pipe 12 and the second pipe 14 may be metallic. In the illustrated example, the first pipe 12 and the second pipe 14 have the same structure. The first and second pipes 12, 14 are opposed and spaced apart from one another to provide a gap there between.

In the illustrated example the first pipe 12 and second pipe 14 are tubular, i.e. cylindrical in shape and having a circular cross-section. Other shapes and cross-sections are possible. Whilst in FIG. 1 the first pipe 12 and second pipe 14 are shown as coaxial extending about an axis A-A, this is not essential and examples are envisaged in which the axes of the first pipe 12 and second pipe 14 are at an angle with respect to each other. The angle may be less than 90, 60, 30, 15, 10 or 5 degrees, for example.

Both the first pipe 12 and the second pipe 14 terminate in a shoulder portion 16. The shoulder portion 16 has an increased outer diameter and/or thickness compared to the portion of the respective pipe 12, 14 that is adjacent to it. The shoulder portion 16 comprises a first radial surface 18 extending inwardly from the radially outer axial surface 20 thereof and an axial surface 22 extending away from the opposed pipe and joined to the radially inner axial surface 24 of the pipe 12, 14 by a second radial surface 26. Thus, the first and second pipes 12, 14 comprise a flange 28 extending axially from the second radial surface 26 to form a stepped or cut-out portion in the shoulder portion 16.

A resistive, semi-conductive or non-conductive component or liner 30 is located between the first pipe 12 and the second pipe 14. The liner 30 connects the first pipe 12 to the second pipe 14 and maintains a fluid path (see arrow 100) there between. The liner 30 is shown as tubular in FIG. 1, and coaxial with the first pipe 12 and second pipe 14. Other configurations are possible, for example if the axes of the first pipe 12 and the second pipe 14 are at an angle with respect to each other as discussed above. The liner 30 is resistive, semi-conductive or non-conductive such that it does not itself conduct or transfer electric current between the first pipe 12 and the second pipe 14. The liner 30 may be formed from any suitable material such as for example, polyether ether ketone—"PEEK".

Each axial end of the liner 30 comprises a first radial surface 32 extending radially outwardly from the radially inner axial surface 34 of the liner 30. An axial surface 36 extends from a radially outer end of each radial surface 32 towards the opposed axial end of the liner 30. A second radial surface 38 then extends radially outwardly from each axial surface 36 to the radially outer axial surface 40 of the liner 30. Thus, as shown in FIG. 1, the liner 30 forms a radially inner section 42 having an axial dimension w1 extending between the opposed first radial surfaces 32 and a radially outer section 44 having an axial dimension w2 (where w2<w1) extending between the second radial surfaces 38. Thus, when viewed in cross section above the axis A-A, the liner forms a step between the radially inner and outer sections 42, 44 and is in the shape of an inverted T.

In any example isolator, a minimum gap between the first and second pipes 12, 14 at the wet surfaces thereof is required. This may typically be provided by the axial length w1 of the annular liner 24 extending between the wet surfaces of the respective first and second pipes 12, 14 and may be about 3.81 cm (1.5 inches). It will be appreciated however that the gap required will be dependent on the dimensions and intended use of a particular isolator and may be defined by the expected static and electrical requirements thereof. Thus, in an alternative example of the disclosure, the minimum gap between the first and second pipes at the wet surfaces thereof may be about 1.27 cm to about 2.54 cm (about 0.5 inches to about 1 inch).

The respective flanges 28 of the first pipe 12 and second pipe 14 are configured to fit and/or slide over the radially inner section 42 of the liner 30. As such, when the isolator of FIG. 1 is assembled, the first radial surfaces 18 of the first and second pipes 12, 14 mate with the respective second radial surfaces 38 of the liner 30, the second radial surfaces 26 of the first and second pipes 12, 14 mate with the respective first radial surfaces 32 of the liner 30, and the axial surfaces 22 of the first and second pipes 12, 14 mate with the respective axial surfaces 36 of the liner 30.

The inner diameter of the liner 30 may be the same as that of the first pipe 12 and the second pipe 14 such that, when assembled the radially inner axial surface 34 of the liner 30 is substantially flush with the radially inner axial surfaces 24 of the first and second pipes 12, 14. This can assist in reducing disturbances to fluid flowing through the electrical isolator 10.

The shoulder portions 16 of the first pipe 12 and/or second pipe 14 may be shaped so as to taper from a relatively small outer diameter to a relatively large outer diameter, when moving towards the end of the respective pipe 12, 14 (or towards the liner 30). The shoulder portions 16 thus comprise a ramp whose outer diameter increases when moving towards the end of the respective pipe 12, 14 (or towards the liner 30).

The outer diameter of the liner 30 may be the same as that of the shoulder portions 16 of the first pipe 12 and second pipe 14. This creates a smooth transition from the outer surface of the liner 30 to the outer surface of the first pipe 12 and second pipe 14.

The liner 30 is fluidly sealed against both the first pipe 12 and the second pipe 14 using one or more sealing members 46. In the illustrated example, the sealing members 46 are annular "O" rings. The annular "O" rings sit within respective grooves 48 on the radially inner faces 22 of the annular flanges 28 of the first pipe 12 and second pipe 14. It would be possible to use more than one "O" ring seal on either side of the liner 30 or to use different types of seal. In other arrangements, it would be possible for example to provide the grooves on the radially inner section 42 of the liner 30 instead.

In accordance with the present disclosure, a reinforcing composite 50 is located around the first pipe 12, the second pipe 14 and the liner 30. The reinforcing composite comprises fibre and a resin mixture. The fibre may be glass fibre, carbon fibre or aramid fibre. The resin mixture may comprise a resin that may be of thermoset (e.g. epoxy) or thermoplastic (e.g. polyether ether ketone—"PEEK") construction.

The reinforcing composite 50 may consist of, or consist essentially of the fibre and resin mixture. The reinforcing composite 50 may be continuous and cover all of the first pipe 12, second pipe 14 and liner 30 with no air gap and/or other material in between. The first pipe 12 and second pipe 14 may comprise a surface coating or treatment, and the surface coating or treatment may be the only material between the first pipe 12 or second pipe 14 and the reinforcing composite 50.

The reinforcing composite 50 extends axially past the shoulder portions 16 of the first pipe 12 and the second pipe 14. As such, the internal diameter of the reinforcing composite 50 decreases as the reinforcing composite 50 extends over and hugs the tapering surface of the first and second pipes 12, 14 at the shoulder portion 16.

Due to the reinforcing composite 50 extending axially past the shoulder portion 16, the smallest internal diameter of the reinforcing composite 50 (i.e. past the shoulder portion 16) may be less than the largest outer diameter of the first pipe 12 and the second pipe 14 (i.e. at the shoulder portion 16). In this manner, the first pipe 12, second pipe 14 and the liner 30 may be held captive by the reinforcing composite 50.

The resin mixture comprises a conductive additive, for example carbon black and/or carbon nanotubes, and this can be incorporated into the resin mixture in varying amounts to achieve the desired conductivity for a particular application.

Alternatively, or additionally the desired conductivity could be achieved by varying the amount of fibre or resin mixture in the composite 50. It will be appreciated that the conductivity of the composite 50 is a function of the relative amounts of fibre, resin and additive and these amounts could be varied to provide any desired conductivity. The conductive additive may be present in the resin mixture in an amount between 0-10 wt. %.

The reinforcing composite allows the electrical isolator to withstand the high internal pressures to which it will be subjected when used in a hydraulic system without leaking. To achieve the best resistance to both the radial and axial forces exerted on the electrical isolator, the reinforcing composite may comprise fibres wound circumferentially around the pipes and the resistive, semi-conductive or non-conductive component (for the radial forces) and fibres wound helically around the pipes and the resistive, semi-conductive or non-conductive component (for the axial forces and some radial force). In one example of the disclosure, the reinforcing composite comprises a layer of circumferentially wound fibre-reinforced polymer extending circumferentially around the first fluid-carrying member, the second fluid-carrying member and the resistive, semi-conductive or non-conductive component and a layer of helical wound fibre-reinforced polymer extending helically around the layer of circumferentially wound fibre-reinforced polymer, the first fluid-carrying member, the second fluid-carrying member and the resistive, semi-conductive or non-conductive component.

The layer of circumferentially wound fibre (also referred to as "hoop" fibre) provides additional pressure resistance to the electrical isolator. Hoop fibre is wound with a high angle to the axis of the structure such that it is wound in a very tight helix (or in some cases, even wound directly over itself, i.e. at ninety degrees to the axis). As such, hoop fibre cannot expand under radial pressure and is therefore strong against radial loads, i.e. it is pressure resistant. Such an electrical isolator with a layer of hoop fibre is better adapted to the high pressures of hydraulic systems.

While circumferential fibre is well-suited to providing pressure resistance, it is not well-suited to holding the electrical isolator together as it does not provide much strength in the axial direction. However, the layer of helical wound fibre does provide axial strength.

Circumferential fibre here means fibre with a high winding angle (the angle that the fibre makes with the axis of the part (usually mounted on a mandrel) during winding), typically from 80 degrees up to 90 degrees, more preferably at least 85 degrees.

Helical fibre here means fibre with a low winding angle, typically between 30 degrees and 70 degrees. It is often difficult to wind fibre at angles below about 30 degrees, while angles above 70 degrees do not provide the required axial strength. Lower angles are however still viable, down to essentially 0 degrees if fibre placement can be achieved. Even true axial fibre can be used instead of helical fibre (i.e. fibre with an angle of 0 degrees to the axis, i.e. parallel to the axis), but placement of such fibre is difficult.

The features discussed above provide an electrical isolator achieving a balance of controlling electric current and dissipating electric charge, whilst also being capable of withstanding high pressures. The issue of high fluid pressure is particularly important when incorporating an electrical isolator in a hydraulic fluid line, for example that of an aircraft, which typically operate at a higher pressure, for example greater than 3000 psi, than for example fuel lines, which operate at pressures of about 100 psi.

This can be used in pressurised fluid systems that require controlled electrical resistance. The electrical isolators described herein achieve robust static sealing, resilience to fatigue, electrical continuity.

A method of forming the electrical isolator 10 of FIG. 1 will now be described.

The first pipe 12 and the second pipe 14 may be provided. The first pipe 12 and/or second pipe 14 may form part of a pipe network, or each comprise the end portion of a larger pipe. The electrical isolator 10 may be part of a hydraulic pipe network operating at greater than 1000, 2000 or 3000 psi, for example a hydraulic system or hydraulic fluid pipe in an aircraft.

Ring seals 46 are inserted into respective grooves 48 on the first pipe 12 and second pipe 14. The ends of the first pipe 12 and the second pipe 14 may then be brought close to one another and slid over the radially inner portion 42 of the resistive, semi-conductive or non-conductive component or liner 30 so that the liner 30 is located there between.

Due to the presence of seals 46, the liner 30 is fluidly sealed against the first pipe 12 and the second pipe 14. This allows fluid to flow or be conveyed from the first pipe 12 to the second pipe 14.

In order to provide reinforcement, a reinforcing composite 50 is located around the first pipe 12, the second pipe 14 and the liner 30. The composite 50 may be continuous and contact all of the first pipe 12, second pipe 14 and the liner 30.

To form the composite 50, a fibre (e.g. a glass fibre) may be drawn through a bath containing the resin mixture, and then the fibre and resin mixture may be wound around the first pipe 12, liner 30, and second pipe 14 until the fibre and resin mixture composite exhibits a sufficient thickness and covers all of the first pipe 12, second pipe 14 and liner 30. The orientation of the fibres may be controlled, for example using an automated layup method. As discussed above, the resin mixture comprises a conductive additive. This can be added and mixed into the resin contained in the bath in varying amounts, to alter or change the conductivity of the composite 50.

The composite 50 may also be formed using a fibre material that has been impregnated with a resin, rather than drawing the resin through a resin bath as described above.

The glass fibre and resin mixture is cured to form the reinforcing composite 50 that is located around and contacts the first pipe 12, second pipe 14 and liner 30. Once cured, the reinforcing composite acts to hold the components of the electrical insulator 10 together to provide strength and resistance when high pressure fluids are passed through the electrical insulator 10.

The method may further comprise passing fluid through the electrical isolator 10, i.e. from the first pipe 12 to the second pipe 14 via the liner 30, at a pressure of greater than 1000, 2000 or 3000 psi.

Figure 2:
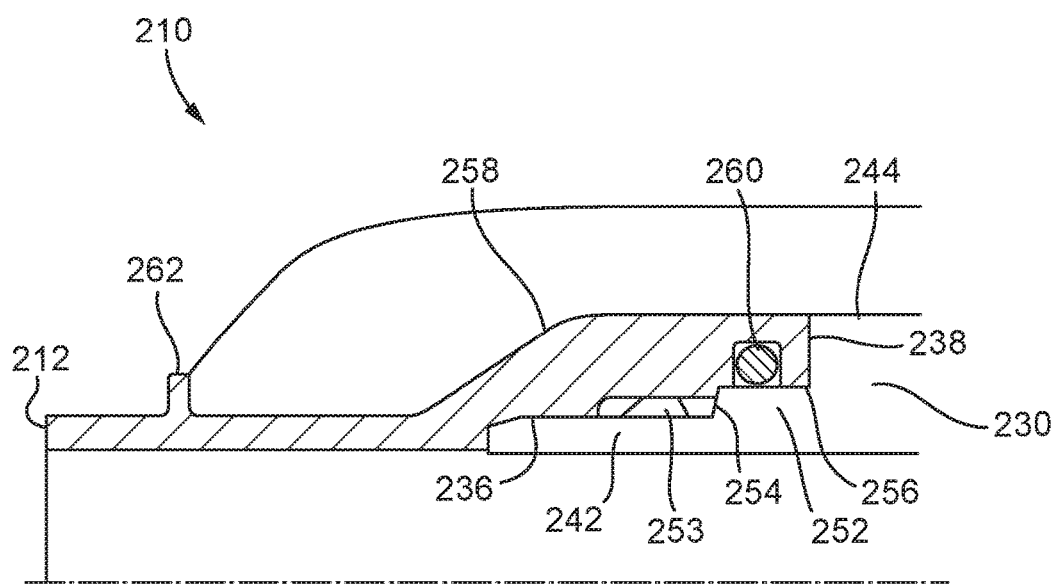
FIG. 2 shows a cross-section of part of an electrical isolator in accordance with an example of the present disclosure.

FIG. 2 shows a cross section of part of an electrical isolator or fluid carrying element 210 according to an alternative example of the present disclosure. It will be understood that the part of the electrical isolator shown in FIG. 2 is symmetrical about the axis A-A and is also horizontally symmetrical.

In the example of FIG. 2, the liner 230 comprises a radially inner portion 242 as in the example of FIG. 1. However, an additional stepped portion 252 having an axial dimension w3 (not shown) is provided between the radially inner portion 242 and the radially outer portion 244, where w1>w3>w2. Thus the stepped portion 252 comprises a radial surface 254 extending between the axial surface 236 of the radially inner portion 242 and an axial surface 256 of the stepped portion 252. The radial surface 238 of the radially outer portion 244 extends radially outwardly from the axial surface 256 of the stepped portion. A corresponding stepped portion 258 is formed in the respective flange 228 of the first pipe 212 such that the first and second (not shown) pipes 212, 214 are configured to fit and/or slide over the radially inner section 242 and the stepped portion 252 of the liner 230. As such, when the isolator 210 of FIG. 2 is assembled, the first radial surface 218 of the first pipe 212 mates with the respective second radial surface 238 of the liner 230, the second radial surface 226 of the first pipe 212 mates with the first radial surface 232 of the liner 230 and the axial surface 222 of the first pipe 212 mates with the axial surface 236 of the liner 230.

As seen in FIG. 2, a first sealing member or fluid seal 253 is provided between the axial surface 236 of the radially inner portion and the mating surface of the first pipe 212. The first sealing member or fluid seal 253 may comprise an O-ring with a back-up O-ring to prevent extrusion of the first O-ring under pressure. A second sealing member 260 or environmental seal may be provided between the axial surface 256 of the stepped portion and the mating surface of the first pipe 212. The environmental seal 260 may comprise an O-ring provided in a groove in the first pipe 212. The environmental seal 260 in this or any other examples of the disclosure may serve to prevent resin bleeding into the fluid seal 253 and other internal parts during winding and curing of the reinforcing composite 250 during production of the electrical isolator 210 of the disclosure.

As also seen in FIG. 2, a flange 262 may extend radially outwardly from the radially outer surface of the first pipe 212. The flange 262 may function to prevent or reduce winding slip of the wound composite 250 thus improving performance of the electrical isolator under pressure. The flange 262 may also function as a resin dam to prevent resin bleed encroaching on the pipe 212 axially beyond the flange 262 during winding and/or cure.

Figure 3:
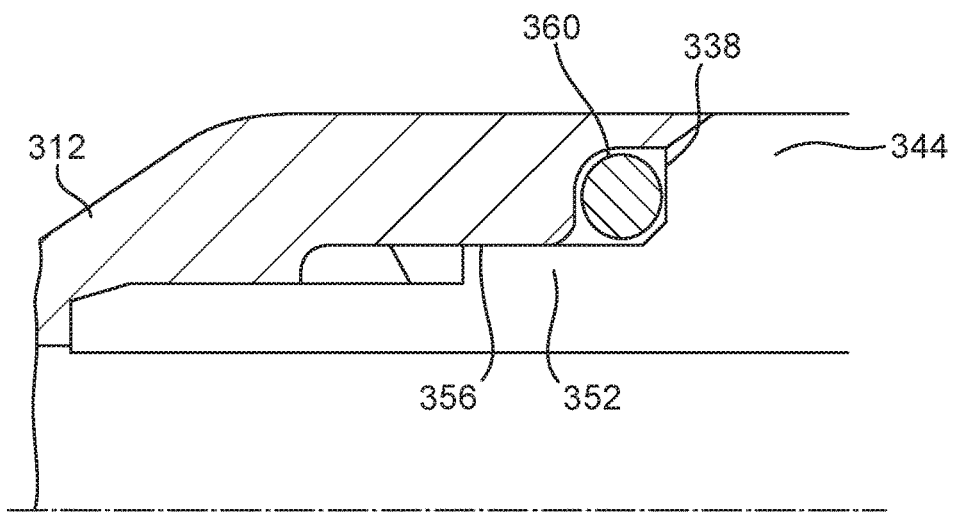
FIG. 3 shows a cross-section of part of an electrical isolator in accordance with an example of the present disclosure.

FIG. 3 shows a cross section of part of an electrical isolator or fluid carrying element 310 according to an alternative example of the present disclosure. It will be understood that the part of the electrical isolator shown in FIG. 3 is symmetrical about the axis A-A and is also horizontally symmetrical. The electrical isolator 310 corresponds substantially to that shown in FIG. 2. In the example of FIG. 3 however, the environmental seal or second sealing member 360 is provided so as to seal between both the axial surface 356 of the stepped portion 352 and the mating surface of the first pipe 312 and between the radial surface 338 of the radially outer portion 344 and the mating surface of the first pipe 312. In one example, the second sealing member 360 may comprise an O-ring provided in a split groove formed across the axial surface 356 of the stepped portion 352 and the radial surface 338 of the radially outer portion 344. The spilt groove may be simpler to machine than the grooves 48 shown in FIG. 1 for example. Further, the resultant bore is easier to locate seals into than the grooves 8 formed in the annular flanges 28 of the first and second pipes 12, 14. The split groove may also be easier to inspect.

Figure 4:
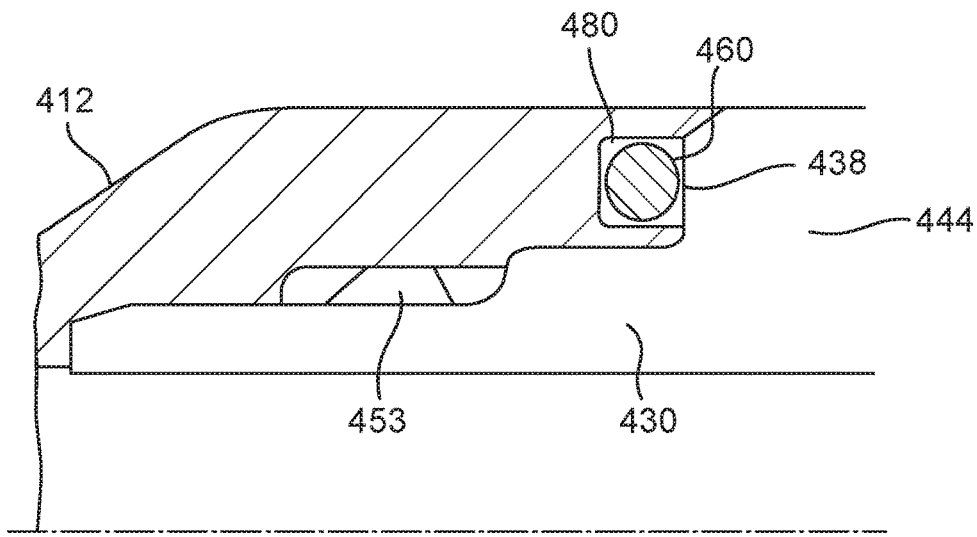
FIG. 4 shows a cross-section of part of an electrical isolator in accordance with an example of the present disclosure.

FIG. 4 shows a cross section of part of an electrical isolator or fluid carrying element 410 according to an alternative example of the present disclosure. It will be understood that the part of the electrical isolator shown in FIG. 4 is symmetrical about the axis A-A and is also horizontally symmetrical. The electrical isolator corresponds substantially to that shown in FIGS. 2 and 3. In the example of FIG. 4, the environmental seal or second sealing member 460 is provided so as to seal between the radial surface 438 of the radially outer portion 444 and the mating surface of the first pipe 412. In one example, the second sealing member 460 may comprise an O-ring provided in a groove 480 formed in the radial surface 438 of the radially outer portion 444.

FIG. 5 shows a cross section of part of an electrical isolator or fluid carrying element 510 according to an alternative example of the present disclosure. It will be understood that the part of the electrical isolator shown in FIG. 5 is symmetrical about the axis A-A and is also horizontally symmetrical. In the example of FIG. 5, the liner 530 comprises a radially inner portion 542 as in the example of FIG. 1. The liner 530 further comprises a radially outer portion 544 having a first 564 and second (not shown) radial surface extending radially outwardly from the axial surface 536 of the radially inner portion 542 and an axial surface 566 extending between the first and second radial surfaces 564. As shown in FIG. 5, a fluid seal 553 forms a seal between the axial surface 536 of the radially inner portion 542 and a mating surface of the first pipe 512.

The pipe 512 comprises a shoulder portion 516 as described in relation to FIG. 1. As seen in FIG. 5, when the electrical isolator 510 of this example is assembled, the radially outer axial surface 520 of the shoulder 516 extends radially beyond the axial surface 566 of the liner 530. The shoulder portion 516 comprises a first radial surface 518 extending inwardly from the radially outer axial surface 520 thereof and an axial surface 522 extending away from the opposed pipe and being joined to the radially inner axial surface 524 of the pipe 512, 514 by a second radial surface 526. A face seal 568 is provided to extend between the first radial surface 518 of the pipe 512 and a corresponding radial surface on the second pipe (not shown) from the axial surface 566 of the liner 530 to be flush with the radially outer surface 520 of the shoulder 516. Face seal here means a seal which may be squeezed between two faces, such as the first radial surface 518 and a corresponding radial surface (not shown) on the shoulder (not shown) of the adjacent pipe (not shown). The face seal 568 may comprise an elastomeric or composite seal material, for example, nitrile rubber, silicone rubber or a composite. Alternatively, the face seal 568 may comprise an X-Ring or Square-Rig standard section elastomer ring such as a BECA 016 static seal.

In the example of FIG. 5, the environmental seal is formed by a face seal 568 rather than one or more O-ring seals. The face seal 568 is formed from a non-conductive or resistive material and so together with the liner 530, provides the required isolator material across the gap between the first 512 and second (not shown) pipes.

In the example of FIG. 5, use of the face seal 568 enables both an environmental seal and a fluid seal to be provided within the minimum required gap (w1 in FIG. 1) between wetted surfaces of the electrical isolator. The volume of material required for the shoulder 516 and the liner 530 is also reduced and moulding and machining costs will be reduced compared to the examples shown in FIGS. 2 to 4.

A method of forming the electrical isolator 510 of FIG. 5 will now be described.

The first pipe 512 and the second pipe (not shown) may be provided. The first pipe 512 and/or second pipe may form part of a pipe network, or each comprise the end portion of a larger pipe. The electrical isolator 510 may be part of a hydraulic pipe network operating at greater than 1000, 2000 or 3000 psi, for example a hydraulic system or hydraulic fluid pipe in an aircraft.

The fluid seals 553 are inserted into respective grooves on the first pipe 512 and second pipe (not shown). A face seal 568 is provided in contact with a radially outward axial face of the liner 530 and aligned with the liner 530. The ends of the first pipe 512 and the second pipe (not shown) may then be brought close to one another and slid over the radially inner portion 542 of the liner 530 so that the liner 530 and the face seal 568 are located there between. A clamping force is then applied to the face seal 568 so as to compress the face seal 568 against the liner 530.

Due to the presence of the fluid seals 553, the liner 530 is fluidly sealed against the first pipe 512 and the second pipe. This allows fluid to flow or be conveyed from the first pipe 512 to the second pipe.

In order to provide reinforcement, a reinforcing composite 550 is located around the first pipe 512, the second pipe 514 and the liner 530. The composite 550 may be continuous and contact all of the first pipe 512, second pipe 514 and the liner 530.

The composite 550 may be formed by the method described with reference to FIG. 1.

Once the glass fibre and resin mixture has been cured, the clamping force is removed from the face seal 568.

FIG. 6 shows a cross section of part of an electrical isolator or fluid carrying element 610 according to an alternative example of the present disclosure. It will be understood that the part of the electrical isolator shown in FIG. 6 is symmetrical about the axis A-A and is also horizontally symmetrical. In the example of FIG. 6, the radially outer axial surface 636 of the radially inner portion 642 of the liner 630 is adapted to mate with the radially inner surface 624 of the pipe 612. As in the example of FIG. 5, the liner 630 comprises a radially inner portion 642 and a radially outer portion 644. The shoulder 616 of the pipe 612 is configured to mate with the liner 616 and a fluid seal 653 forms a seal between the axial surface 636 of the radially inner portion 642 and a mating surface of the first pipe 612.

As in the example of FIG. 5, a face seal 668 is provided to extend between the first radial surface 618 of the pipe 612 and a corresponding radial surface on the second pipe (not shown) from the axial surface 666 of the liner 630 to be flush with the radially outer surface 620 of the shoulder 616.

The electrical isolator 610 of FIG. 6 may be formed by the method described in relation to FIG. 5. The example of FIG. 6 is simple to machine and assemble.

Although the present disclosure has been described with reference to various examples, it will be understood by those skilled in the art that various changes in form and detail may be made without departing from the scope of the disclosure as set forth in the accompanying claims.

What is claimed is:

1. An electrical isolator comprising:
    a first fluid-carrying member and a second fluid-carrying member spaced apart from the first fluid-carrying member in an axial direction;
    a resistive, semi-conductive or non-conductive component (component) located between the first and second fluid-carrying member, wherein the component is adapted to convey fluid flowing from the first fluid-carrying member to the second fluid-carrying member;
    a first fluid sealing member provided between the first fluid-carrying member and the component;
    a second fluid sealing member provided between the second fluid-carrying member and the component;
    a reinforcing composite encircling the first fluid-carrying member, the second fluid-carrying member and the component,
    wherein a radially inner portion of the component separates the first fluid-carrying member and the second fluid-carrying member by an axial distance, and
    wherein the component is configured such that the first and second sealing members are located within the axial distance between the first fluid-carrying member and the second fluid-carrying member; and
    a third sealing member provided between the radially outer portion of the component and the first and second fluid-carrying members.

2. An electrical isolator as claimed in claim 1, wherein:
    the component comprises the radially inner portion adjacent to a radially outer portion, the radially outer portion having a second axial dimension;
    the second axial dimension is less than a first axial dimension of the radially inner portion; and
    the axial distance is equal to the first axial dimension.

3. An electrical isolator as claimed in claim 2, wherein:
    the first fluid sealing member is provided between the radially inner portion and the first fluid-carrying member on a first side of the radially outer portion; and
    the second fluid sealing member is provided between the radially inner portion and the second fluid-carrying member on a second side of the radially outer portion.

4. An electrical isolator as claimed in claim 1, wherein the radially inner portion of the component is substantially flush with a radially inner surface of the first fluid-carrying member and the second fluid-carrying member.

5. An electrical isolator as claimed in claim 1, wherein the third sealing member or the third and fourth sealing members comprise one or more environmental seals.

6. An electrical isolator as claimed in claim 1, wherein the third sealing member comprises a resistive, semi conductive or non-conductive material and extends from the first fluid-carrying member to the second fluid-carrying member.

7. An electrical isolator as claimed in claim 1, wherein the first axial dimension is between about 0.5 cm (about 0.2") and about 5 cm (about 2").

8. An electrical isolator as claimed in claim 1, wherein the first axial dimension is between 1.27 cm (about 0.5") and 3.81 cm (about 1.5").

9. A hydraulic system in an aircraft comprising:
    an electrical isolator as claimed in claim 1.

10. An electrical isolator comprising:
    a first fluid-carrying member and a second fluid-carrying member spaced apart from the first fluid-carrying member in an axial direction;
    a resistive, semi-conductive or non-conductive component (component) located between the first and second fluid-carrying member, wherein the component is adapted to convey fluid flowing from the first fluid-carrying member to the second fluid-carrying member;
    a first fluid sealing member provided between the first fluid-carrying member and the component;
    a second fluid sealing member provided between the second fluid-carrying member and the component; and
    a reinforcing composite encircling the first fluid-carrying member, the second fluid-carrying member and the component,
    wherein a radially inner portion of the component separates the first fluid-carrying member and the second fluid-carrying member by an axial distance, and
    wherein the component is configured such that the first and second sealing members are located within the axial distance between the first fluid-carrying member and the second fluid-carrying member;
    wherein:
    the component comprises the radially inner portion adjacent to a radially outer portion, the radially outer portion having a second axial dimension;
    the second axial dimension is less than a first axial dimension of the radially inner portion; and
    the axial distance is equal to the first axial dimension;
    wherein the component further comprises a stepped portion provided between the radially inner portion and the radially outer portion, wherein the stepped portion has a third axial dimension,
    wherein the first axial dimension is greater than the third axial dimension and the third axial dimension is greater than the second axial dimension.

11. An electrical isolator as claimed in claim 10, wherein a third sealing member is provided between the stepped portion and/or the radially outer portion and the first fluid-carrying member, and
    a fourth sealing member is provided between the stepped portion and/or the radially outer portion and the second fluid-carrying member.

12. A method of forming one or more electrical isolators, the method comprising:
    placing a resistive, semi-conductive or non-conductive component (component) between a first fluid-carrying member and a second fluid-carrying member such that a radially inner portion of the resistive, semi-conductive or non-conductive component separates the first fluid-carrying member and the second fluid-carrying member by an axial distance;
    providing a first fluid sealing member between the first fluid-carrying member and the component;
    providing a second fluid sealing member between the second fluid-carrying member and the component, wherein the component is configured such that the first and second fluid sealing members are located within the axial distance between the first fluid-carrying member and the second fluid-carrying member;
winding a fibre and resin mixture around the first fluid carrying-member, the component and the second fluid-carrying member;
curing the fibre and resin mixture;
prior to winding the fibre and resin matrix, providing a third sealing member between the first and second fluid carrying members and adjacent the component;
applying a compressive force to the third sealing member; and
after curing the fibre and resin mixture, removing the compressive force from the third sealing member.

* * * * *